United States Patent [19]

Sibigtroth

[11] Patent Number: 4,873,624
[45] Date of Patent: Oct. 10, 1989

[54] OUTPUT COMPARE SYSTEM AND METHOD FOR A DATA PROCESSOR

[75] Inventor: James M. Sibigtroth, Austin, Tex.

[73] Assignee: Motorola, Inc., Schaumburg, Ill.

[21] Appl. No.: 262,186

[22] Filed: Oct. 20, 1988

Related U.S. Application Data

[63] Continuation of Ser. No. 885,800, Jul. 14, 1986, abandoned, which is a continuation of Ser. No. 549,367, Nov. 4, 1983, abandoned.

[51] Int. Cl.⁴ ............................................. G06F 1/04
[52] U.S. Cl. ...................................... 364/200; 377/39
[58] Field of Search .......................................... 377/39; 364/200 MS File, 900 MS File

[56] References Cited

U.S. PATENT DOCUMENTS

| | | | |
|---|---|---|---|
| 3,609,308 | 9/1971 | Lemon | 377/39 |
| 4,017,841 | 4/1977 | Jenson | 364/900 |
| 4,032,756 | 6/1977 | Jezo | 377/39 |
| 4,158,129 | 6/1979 | Baumgartner | 377/39 |
| 4,365,202 | 12/1982 | Sinniger | 377/39 |

*Primary Examiner*—Gary V. Harkcom
*Assistant Examiner*—Christopher H. Lynt
*Attorney, Agent, or Firm*—Robert L. King; Jeffery Van Myers

[57] ABSTRACT

A data processor and method includes a timer system for producing a first output compare signal when a counter value equals a compare value. A register alternatively produces a second output compare signal in response to having a given bit value written therein. Logic circuitry provides an output compare function in response to either the first or the second output compare signals.

2 Claims, 2 Drawing Sheets

OUTPUT COMPARE SYSTEM AND METHOD FOR A DATA PROCESSOR

This application is a continuation of application Ser. No. 885,800, filed July 14, 1986, now abandoned, which is a continuation of application Ser. No. 549,367, filed Nov. 4, 1983, now abandoned.

BACKGROUND OF THE INVENTION

The present invention relates, in general, to the field of data processors and methods. More particularly, the present invention relates to an output compare system and method for a microprocessor or microcomputer having a timer output compare force register by which any combination of specified output compare actions may be implemented even if the output compare value does not equal the counter value.

In former MPU and MCU systems, there have been provided output compare functions to generate a timed output signal from the device. Such output signals could be used to either (1) set the output, (2) clear the output, (3) toggle the output, or (4) indicate no change to the output. In implementing this output compare function, it has formerly been necessary to initiate a 16 bit read of the MPU/MCU counter present value, add a 16 bit value to compensate for the required software, and finally write a 16 bit number to the compare register so that a normal compare operation would subsequently result. Implementing an output compare function by means of software resulted in uncertainty with regard to output pulse synchronization, as well as requiring substantial program space and introducing increased latency to the desired output action.

SUMMARY OF THE INVENTION

It is therefore an object of the present invention to provide an improved output compare system and method for a data processor.

It is further an object of the present invention to provide an improved output compare system and method for a data processor which minimizes program space and decreases latency to the desired output action.

It is still further an object of the present invention to provide an improved output compare system and method for a data processor which provides a highly accurate timed output signal synchronized with the data processor timer clock.

It is still further an object of the present invention to provide an improved output compare system and method for a data processor which ensures that no pulse narrower than a timer count may be produced.

The foregoing and other objects are achieved in the present invention wherein there is provided a data processor, including a timer system for producing a first output compare signal when a counter value thereof equals a compare value thereof, which comprises register means for alternatively producing a second output compare signal in response to having a given bit value written therein. Logic means provide an output compare function in response to either the first or the second output compare signals. In accordance with the method of the present invention an output compare function in a data processor having a first output compare signal produced when a counter value thereof equals a compare value thereof, comprises the steps of providing register means for receiving first and second bit values therein. A first bit value is written into the register means and a second output compare signal is produced in response to the first bit value being written into the register means. An output compare function is allowed to occur in response to either the first or the second output compare signals.

Further provided is a timer system which comprises an output compare register for producing a first output compare signal when a counter value thereof equals a compare value thereof. A forced output compare register produces a second output compare signal in response to having a given bit value written therein and logic means initiate an output compare function in response to either the first or the second output compare signals.

BRIEF DESCRIPTION OF THE DRAWINGS

The above mentioned and other features and objects of the present invention and the manner of attaining them will become more apparent and the invention itself will be best understood by reference to the following description of an embodiment of the invention taken in conjunction with the accompanying drawings, wherein.

DESCRIPTION OF A PREFERRED EMBODIMENT

Figure 1:
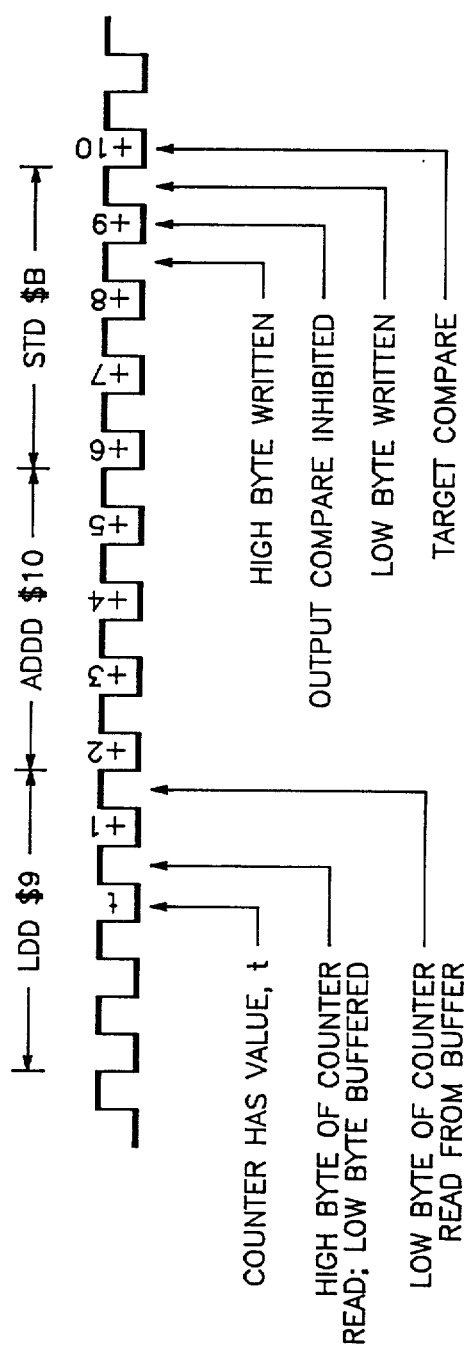
FIG. 1 is a simplified timing diagram illustrative of the programming necessary to implement the output compare function in software instructions to a prior art microcomputer.

With reference to FIG. 1, the timing involved in an instruction sequence in a software implementation of an immediate output compare function in a prior art microcomputer, such as an MC6801 available from Motorola, Inc., assignee of the present invention, is shown. The following three instructions were used to generate an immediate output compare:

LDD $9/GET COUNTER REGISTER VALUE
ADDD #10/ADD AN OFFSET
STD $B/UPDATE OUTPUT COMPARE

If it were undesirable to disturb the A accumulator, the following four-instruction sequence could also be used:

LDAB #9/COUNTER OFFSET TO ACCB
LDX $9/READ COUNTER REGISTER
ABX/ADD OFFSET
STX $B/UPDATE OUTPUT COMPARE

In either instance, valuable program space was necessary to force an output compare function in addition to the latency to the desired output action attendant the program execution.

Figure 2A:
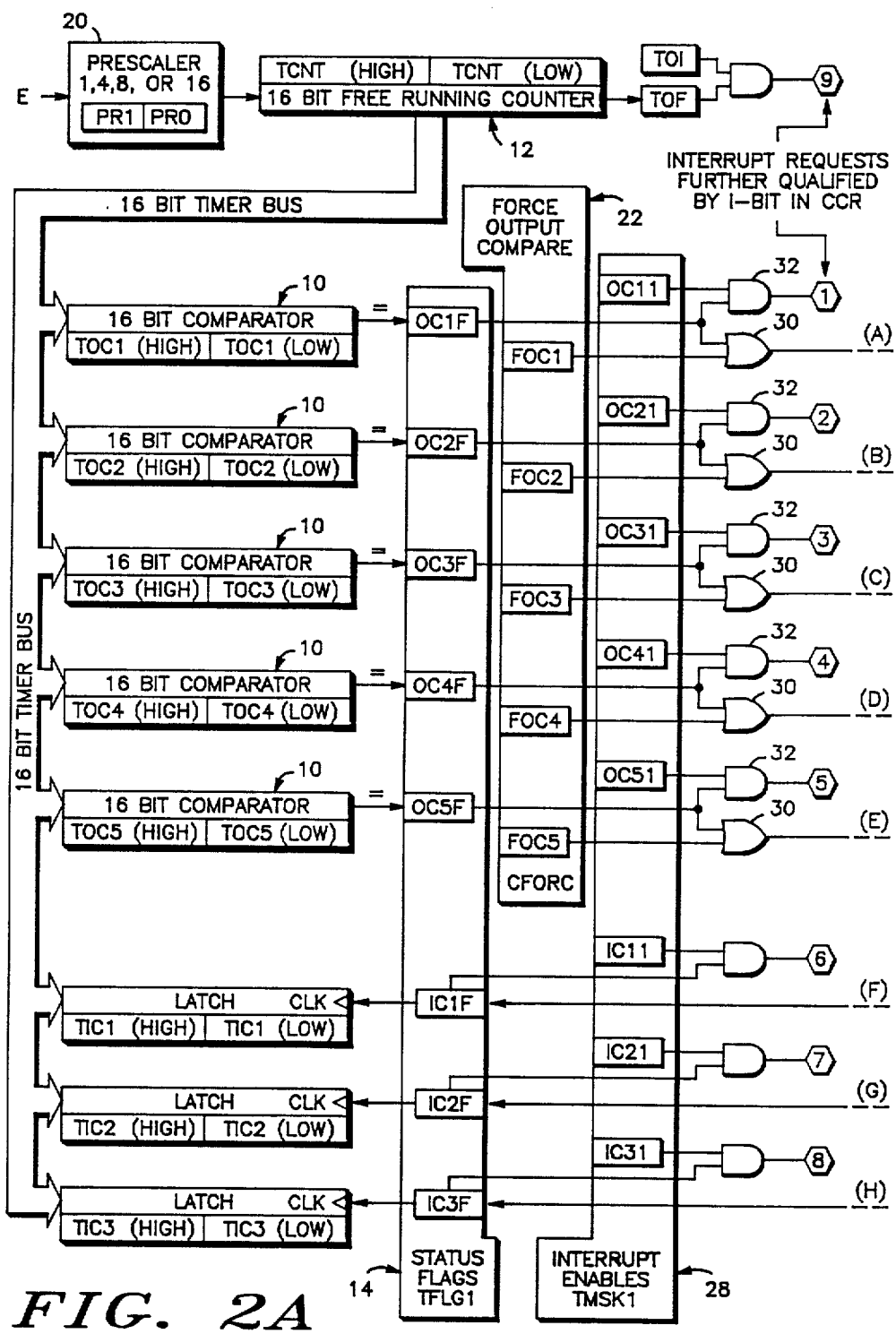
FIGS. 2A and 2B illustrate a simplified logic flow diagram of a data processor system in accordance with the present invention for implementation of an output compare function by means of an output compare or timer compare force registers.
Figure 2B:
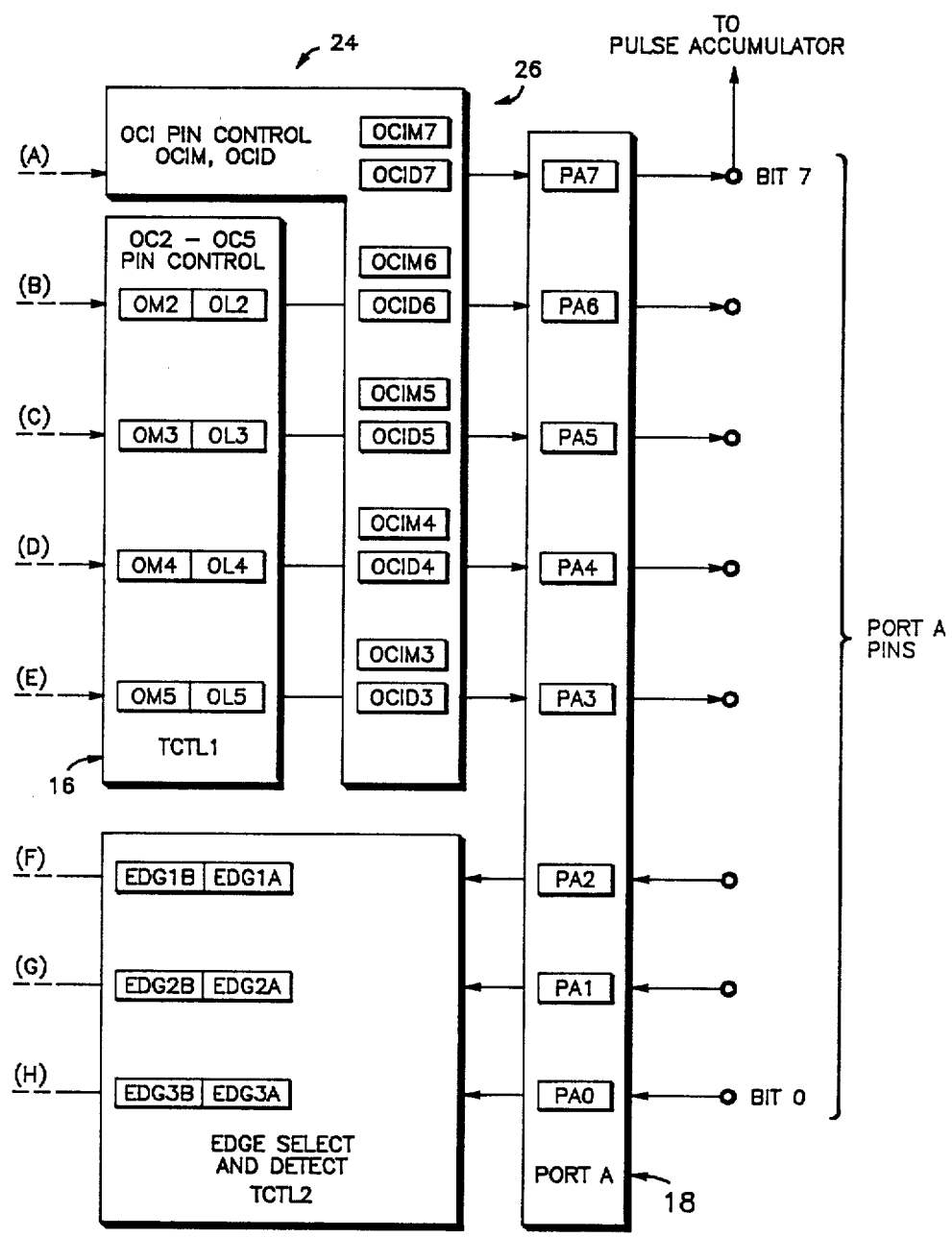

With reference now to FIG. 2, a simplified logic flow diagram of a data processor system in accordance with the present invention for implementation of an output compare function by means of an output compare register 10 or timer compare force register (CFORC) 22 is shown. Timing input to the system is supplied from the data processor E clock for input through prescaler 20 to 16-bit free running counter 12. Prescaler 20 and free running counter 12 are the subject matter of U.S. patent application Ser. No. SC05060 filed on November 2, 1983 by James M. Sibigtroth and David Rivera and assigned to the assignee of the present invention.

Output from free running counter 12 is applied as input to output compare registers 10 by means of a 16-bit timer bus. The output of output compare registers 10 is supplied through timer interrupt flag register (TFLG 1) 14 for input to a like number of OR gates 30. An additional input to OR gates 30 is supplied from the output of timer compare force register (CFORC) 22. Output of main timer interrupt mask register 1 (TMSK 1) 28 in conjunction with the output of timer interrupt flag register 14 supply interrupt requests through a like number of AND gates 32.

The output of OR gates 30 corresponding to output compare 2, 3, 4 and 5 are supplied as input to TCTL 1 control register 16. The output of OR gate 30 corresponding to an output compare 1 function is supplied directly to output compare 1 mask register (OC1M) 24 and output compare 1 data register (OC1D) 26. As shown, the output of TCTL 1 control register 16 is likewise applied to output compare pin logic comprising output compare 1 mask register (OC1M) 24 and output compare 1 data register (OC1D) 26, the output of which is applied to port A 18.

NORMAL OUTPUT COMPARE FUNCTIONS

The Output Compare Registers 10 are 16-bit read/write registers which are initialized to $FFFF by Reset and can be used for several purposes. Two possible applications include controlling an output waveform and indicating when a period of time has elapsed. The five Output Compare Registers 10 are unique in that all bits are readable and writable and are not altered by the timer hardware (except during Reset). If an output compare function is not utilized, the unused registers may be used simply as storage locations.

All Output Compare Registers 10 have a separate dedicated comparator for comparing against the free running counter 12. If a match is found, the corresponding Output Compare Flag (OCxF) bit is set in the Timer Interrupt Flag Register 14 and a specified action is automatically taken. For output compare functions 2 thru 5 the automatic action is controlled by pairs of bits in the TCTL1 control register 16. Each pair of control bits is encoded to specify the output action to be taken as a result of a successful OCx compare. Output compare functions 2 thru 5 are always associated with Port A 18 bits 6 thru 3 respectively.

| OMx | OLx | Action taken upon successful compare |
|-----|-----|--------------------------------------|
| 0 | 0 | Timer disconnected from output pin logic |
| 0 | 1 | Toggle OCx output line |
| 1 | 0 | Clear OCx output line to zero |
| 1 | 1 | Set OCx output line to one |

In some cases the values in the Output Compare Register 10 and the output action control bits must be changed after each successful comparison to control an output waveform or establish a new elapsed timeout.

An interrupt can also accompany a successful output compare provided that the corresponding interrupt enable bit (OCxI) is set.

Due to the prescaler 20, the counter may not change value on each cycle of the E-clock and the comparison may be true for several consecutive E-cycles. In order to avoid multiple output actions, the output action is only permitted to occur during the E-low time immediately following the cycle where the match first became true.

After an MPU write cycle to the register most significant byte, the output compare function is inhibited for one E-cycle in order to allow writing two consecutive bytes before making the next comparison. If both bytes of the register are to be changed, a double byte write instruction should be used in order to take advantage of the compare inhibit feature.

MPU writes can be made to either byte of the Output Compare Register 10 without affecting the other byte. When a compare occurs, the output action is taken regardless of whether or not the Output Compare Flag (OCxF) of Timer Interrupt Flag Register 14 was previously set.

In the MC6801 timer system, the only way to force a timer compare action was to write a 16-bit value slightly larger than the present counter value into the output compare register 10. This was a cumbersome procedure so the present invention includes a write only register to allow forced compares. Five of the bit positions in the CFORC register 22 correspond to the five output compare functions. To force a compare or compares a write is done to CFORC register 22 with the associated bits set for each output compare that is to be forced. The action taken as a result of a forced compare is the same as if there were a match between the OCx register and the free running counter 12 except the corresponding interrupt flag status bits of Timer Interrupt Flag Register 14 are not set.

Unlike the other four compare functions Output Compare 1 can automatically affect any or all of the five output pins (bits 3-7) in Port A 18 as a result of a successful compare between the OC1 register and the 16-bit free running counter 12. Two 5-bit registers are used in conjunction with this function, the Output Compare 1 Mask register (OC1M) 24 and the Output Compare 1 Data register (OC1D) 26.

OC1M 24 is used to specify the bits of Port A 18 (I/O and Timer Port) which are to be affected as a result of a successful OC1 compare. The bits of OC1M 24 correspond bit-for-bit with the bits of Port A 18 (bits 3-7). For each bit that is to be affected by the successful compare, the corresponding bit in OC1M 24 should be set to one. OC1D 26 is used to specify the data which is to be stored to the affected bits of Port A 18 as the result of a successful OC1 compare. The bits of OC1D 26 correspond bit-for-bit with the bits of Port A 18 (bits 3-7). When a successful OC1 compare occurs, for each bit that is set in OC1M 24, the corresponding data bit in OC1D 26 is stored to the corresponding bit of Port A 18. If there is a conflicting situation where an OC1 compare and another output compare function occur during the same E-cycle, and both attempt to alter the same Port A 18 bit, the OC1 action will override.

One reason this function is provided is to allow control of multiple I/O pins automatically with a single output compare function. In a case where the output compare 2 and the output compare 3 functions were being used for internal timing functions, the associated Port A 18 pins would be free to use for other purposes. These two pins can be controlled simultaneously as high speed timed outputs using the output compare 1 function. For the two bits which are to be affected, the corresponding bits in the OC1M 24 register would be set to one. Since the OC1M 24 bits corresponding to the other Port A 18 pin would be zero a successful compare with OC1 would not affect any of those pins.

Another intended use for the special I/O pin control on the output compare 1 function is to allow more than one output compare function to control a single I/O pin. In a case where the output compare 1 function is configured to affect only bit-3 of Port A 18 (by setting OC1M 24=$08), both output compare 1 and output compare 5 are associated with the same Port A 18 bit. The OC5 function can set Port A 18 bit-3 high and the OC1 function can set it low on the very next count of the free running counter 12. This will permit shorter duration pulses than were previously possible.

CFORC TIMER COMPARE FORCE REGISTER 22

The Compare Force (CFORC) Register 22 is used to force early Output Compare actions. A shortcoming of the previous output compare operation was the difficulty in forcing an output compare action which involved reading the Timer Count Register, adding a constant, and writing to the Output Compare Register 10. The CFORC register 22 is an 8-bit write only register except that bits 2, 1, and 0 are not implemented. Reads of this location have no meaning or effect and always return logic zeros ($00). The following Table 1 and paragraphs describe the function of each of the bits.

TABLE 1

| Timer Compare Force Register (CFORC) 22 | | | | | | | |
|---|---|---|---|---|---|---|---|
| B7 | B6 | B5 | B4 | B3 | B2 | B1 | B0 |
| FOC1 | FOC2 | FOC3 | FOC4 | FOC5 | — | — | — |

BIT-7 FOC1—FORCE OUTPUT COMPARE 1 ACTION

Reads of this bit have no meaning and will always return a logic zero value. A write to this bit with the corresponding data bit clear has no effect on the system. A write to this bit with the corresponding data bit set causes the action which is programmed for output compare 1 to occur at the next timer count transition. The action taken is the same as if a successful comparison had just taken place with the OC1 register except the OC1 interrupt flag of Timer Interrupt Flag Register 14 does not get set.

BIT-6 FOC2—FORCE OUTPUT COMPARE 2 ACTION

Reads of this bit have no meaning and will always return a logic zero value. A write to this bit with the corresponding data bit clear has no effect on the system. A write to this bit with the corresponding data bit set causes the action which is programmed for output compare 2 to occur at the next timer count transition. The action taken is the same as if a successful comparison had just taken place with the OC2 register except the OC2 interrupt flag of Timer Interrupt Flag Register 14 does not get set. This function is not recommended when using the toggle output feature of OC2.

BIT-5 FOC3—FORCE OUTPUT COMPARE 3 ACTION

Reads of this bit have no meaning and will always return a logic zero value. A write to this bit with the corresponding data bit clear has no effect on the system. A write to this bit with the corresponding data bit set causes the action which is programmed for output compare 3 to occur at the next timer count transition. The action taken is the same as if a successful comparison had just taken place with the OC3 register except the OC3 interrupt flag of Timer Interrupt Flag Register 14 does not get set. This function is not recommended when using the toggle output feature of OC3.

BIT-4 FOC4—FORCE OUTPUT COMPARE 4 ACTION

Reads of this bit have no meaning and will always return a logic zero value. A write to this bit with the corresponding data bit clear has no effect on the system. A write to this bit with the corresponding data bit set causes the action which is programmed for output compare 4 to occur at the next timer count transition. The action taken is the same as if a successful comparison had just taken place with the OC4 register except the OC4 interrupt flag of Timer Interrupt Flag Register 14 does not get set. This function is not recommended when using the toggle output feature of OC4.

BIT-3 FOC 5—FORCE OUTPUT COMPARE 5 ACTION

Reads of this bit have no meaning and will always return a logic zero value. A write to this bit with the corresponding data bit clear has no effect on the system. A write to this bit with the corresponding data bit set causes the action which is programmed for output compare 5 to occur at the next timer count transition. The action taken is the same as if a successful comparison had just taken place with the OC5 register except the OC5 interrupt flag of Timer Interrupt Flag Register 14 does not get set. This function is not recommended when using the toggle output feature of OC5.

BIT-2 NOT IMPLEMENTED

This bit is not implemented and writes have no meaning or effect on it. Reads of this bit will always return a logic zero value.

BIT-1 NOT IMPLEMENTED

This bit is not implemented and writes have no meaning or effect on it. Reads of this bit will always return a logic zero value.

BIT-0 NOT IMPLEMENTED

This bit is not implemented and writes have no meaning or effect on it. Reads of this bit will always return a logic zero value.

OC1M OUTPUT COMPARE 1 MASK REGISTER 24

This 8-bit read/write register is cleared by reset and is used in conjunction with the Output Compare 1 function to specify the bits of Port A 18 (I/O and Timer Port) which are to be affected as a result of a successful OC1 compare. The following Table 2 and paragraphs describe the function of each of the bits.

TABLE 2

| Output Compare 1 Mask Register (OC1M) 24 | | | | | | | |
|---|---|---|---|---|---|---|---|
| B7 | B6 | B5 | B4 | B3 | B2 | B1 | B0 |
| OC1M7 | OC1M6 | OC1M5 | OC1M4 | OC1M3 | — | — | — |

The bits of OC1M correspond bit-for-bit with the bits of Port A 18 (bits 7 thru 3 only). For each bit that is to be affected by the successful compare, the corresponding bit in OC1M 24 should be set to one.

OC1D OUTPUT COMPARE 1 DATA REGISTER 26

This 8-bit read/write register is used in conjunction with the Output Compare 1 function to specify the data which is to be stored to the affected bits of Port A 18 as the result of a successful OC1 compare. This register is not affected by reset. The following Table 3 and paragraphs describe the function of each of the bits.

TABLE 3

| Output Compare 1 Data Register (OC1D) 26 | | | | | | | |
|---|---|---|---|---|---|---|---|
| B7 | B6 | B5 | B4 | B3 | B2 | B1 | B0 |
| OC1D7 | OC1D6 | OC1D5 | OC1D4 | OC1D3 | — | — | — |

The bits of OC1D 26 correspond bit-for-bit with the bits of Port A 18 (bits 7 thru 3 only). When a successful OC1 compare occurs, for each bit that is set in OC1M 24, the corresponding data bit in OC1D 26 is stored to the corresponding bit of Port A 18. If there is a conflicting situation where an OC1 compare and another output compare function occur during the same E-cycle, and both attempt to alter the same Port A 18 bit, the OC1 action will override.

TCNT 16-BIT TIMER COUNT REGISTER

The key element in the timer system is a 16-bit free running counter 12, or Timer Counter Register, with its associated prescaler 20. The timer counter is incremented to higher values each time the prescaler 20 times out (rollover from $FFFF to $0000 is permitted). Software can read the counter 12 at any time without affecting its value because the counter 12 is clocked and read during opposite half cycles of the MPU E-cycle clock.

A full counter 12 read should first address the most significant byte. An MPU read of this address causes the least significant byte to be latched into a buffer for the next CPU cycle so that a double byte read will return the full 16-bit state of the counter 12 at the time of the most significant byte read cycle. For double byte read instructions, these two accesses occure on consecutive bus cycles. This buffer is normally transparent and is accessed when reading the counter 12 least significant byte.

Because its width is 16 bits, the value in the free running counter 12 repeats every 65,536 counts (prescaler 20 timeouts). When the count changes from $FFFF to $0000 the Timer Overflow Flag (TOF) bit is set. An interrupt can also be enabled when counter overflow occurs by setting its interrupt enable bit, TOI.

TOC1 TIMER OUTPUT COMPARE 1 REGISTER

The Output Compare Registers 10 are 16-bit read/write registers that are initialized to $FFFF during reset and are used to control timer output events. After an MPU write to the register most significant byte, the output compare function is inhibited for one E-clock cycle in order to allow both bytes of the 16-bit register to be written before the next comparison is made. If both bytes of the register are to be changed, a double byte write instruction should be used in order to take advantage of this inhibit feature. Either byte may be written separately without affecting the other byte and timer hardware does not affect these registers except during reset so registers associated with unused timer functions may be used as normal RAM type locations. The timer Output Compare 1 function uses the OC1M 24 and OC1D 26 registers to directly control up to five Port A 18 I/O pins as previously described.

TOC2 TIMER OUTPUT COMPARE 2 REGISTER

The Output Compare Registers 10 are 16-bit read/write registers that are initialized to $FFFF during reset and are used to control timer output events. After an MPU write to the register most significant byte, the output compare function is inhibited for one E-clock cycle in order to allow both bytes of the 16-bit register to be written before the next comparison is made. If both bytes of the register are to be changed, a double byte write instruction should be used in order to take advantage of this inhibit feature. Either byte may be written separately without affecting the other byte and timer hardware does not affect these registers except during reset so registers associated with unused timer functions may be used as normal RAM type locations as previously described.

TOC3 TIMER OUTPUT COMPARE 3 REGISTER

See TOC2 explanation above.

TOC4 TIMER OUTPUT COMPARE 4 REGISTER

See TOC2 explanation above.

TOC5 TIMER OUTPUT COMPARE 5 REGISTER

See TOC2 explanation above.

TCTL1 TIMER CONTROL REGISTER 1 16

The Timer Control Register 1 (TCTL 1) 16 is an 8-bit read/write register. All bits in this register are cleared to zero during reset so that all Output Compare functions (2 thru 5) are disconnected from their corresponding Port A 18 output pins. The following Table 4 and paragraphs describe the function of each of the bits.

TABLE 4

| Timer Control Register 1 (TCTL1) 16 | | | | | | | |
|---|---|---|---|---|---|---|---|
| B7 | B6 | B5 | B4 | B3 | B2 | B1 | B0 |
| OM2 | OL2 | OM3 | OL3 | OM4 | OL4 | OM5 | OL5 |

BIT-7 OM2 OUTPUT MODE
BIT-6 OL2 OUTPUT LEVEL

These two control bits are encoded to specify the output action to be taken as a result of a successful OC2 compare.

| OM2 | OL2 | Action taken upon successful compare |
|---|---|---|
| 0 | 0 | Timer disconnected from output pin logic |
| 0 | 1 | Toggle disconnected from output pin logic |
| 1 | 0 | Clear OC2 output line to zero |
| 1 | 1 | Set OC2 output line to one |

BIT-5 OM3 OUTPUT MODE
BIT-4 OL3 OUTPUT LEVEL

These two control bits are encoded to specify the output action to be taken as a result of a successful OC3 compare.

| OM3 | OL3 | Action taken upon successful compare |
|---|---|---|
| 0 | 0 | Timer disconnected from output pin logic |
| 0 | 1 | Toggle OC3 output line |
| 1 | 0 | Clear OC3 output line to zero |
| 1 | 1 | Set OC3 output line to one |

BIT-3 OM4 OUTPUT MODE
BIT-2 OL4 OUTPUT LEVEL

These two control bits are encoded to specify the output action to be taken as a result of a suffessful OC4 compare.

| OM4 | OL4 | Action taken upon successful compare |
|---|---|---|
| 0 | 0 | Timer disconnected from output pin logic |
| 0 | 1 | Toggle OC4 output line |
| 1 | 0 | Clear OC4 output line to zero |
| 1 | 1 | Set OC4 output line to one |

BIT-1 OM5 OUTPUT MODE
BIT-0 OL5 OUTPUT LEVEL

These two control bits are encoded to specify the output action to be taken as a result of a successful OC5 compare.

| OM4 | OL5 | Action taken upon successful compare |
|---|---|---|
| 0 | 0 | Timer disconnected from output pin logic |
| 0 | 1 | Toggle OC5 output line |
| 1 | 0 | Clear OC5 output line to zero |
| 1 | 1 | Set OC5 output line to one |

MAIN TIMER INTERRUPT MASK REGISTER 1 28

The I-interrupt mask in the CC-register is a class interrupt inhibit and no timer interrupt requests are honored while it is set to one. The Timer System Mask Register 1 (TMSK1) 28 is used to control whether or not a hardware interrupt sequence is requested as a result of a status bit being set in the Timer Flag Register 1 (TFLG1) 14. For each bit in the Timer Flag Register 1 (TFLG1) 14 there is a corresponding bit in the Timer Mask Register 1 (TMSK1) 28 in the same bit position. If and only if the mask bit is set, each time the conditions for the corresponding flag are met, a hardware interrupt sequence will be requested as well as the flag bit being set.

The Timer Interrupt Mask Register is a read/write register and the bits are described in the following Table 5 and paragraphs.

TABLE 5

| Timer Interrupt Mask Register 1 (TMSK1) 28 | | | | | | | |
|---|---|---|---|---|---|---|---|
| B7 | B6 | B5 | B4 | B3 | B2 | B1 | B0 |
| OC1I | OC2I | OC3I | OC4I | OC5I | IC1I | IC2I | IC3I |

BIT-7 OC1I OUTPUT COMPARE 1 INTERRUPT

If the OC1I mask bit is set when the OC1F flag bit is set, a hardware interrupt sequence will also be requested.

BIT-6 OC2I OUTPUT COMPARE 2 INTERRUPT

If the OC2I mask bit is set when the OC2F flag bit is set, a hardware interrupt sequence will also be requested.

BIT-5 OC3I OUTPUT COMPARE 3 INTERRUPT

If the OC3I mask bit is set when the OC3F flag bit is set, a hardware interrupt sequence will also be requested.

BIT-4 OC4I OUTPUT COMPARE 4 INTERRUPT

If the OC4I mask bit is set when the OC4F flag bit is set, a hardware interrupt sequence will also be requested.

BIT-3 OC5I OUTPUT COMPARE 5 INTERRUPT

If the OC5I mask bit is set when the OC5F flag bit is set, a hardware interrupt sequence will also be requested.

MAIN TIMER INTERRUPT FLAG REGISTER 1 TFLG1 14

The Timer Flag Register 1 (TFLG1) 14 is used to indicate the occurrence of timer system events and together with the TMSK1 register 28 allows the timer sub-system to operate in a polled or interrupt driven system. For each bit in the Timer Interrupt Flag Register 1 (TFLG1) 14 there is a corresponding bit in the Timer Mask Register 1 (TMSK1) 28 in the same bit position. If and only if the mask bit is set, each time the conditions for the corresponding flag are met, a hardware interrupt sequence will be requested as well as the flag bit being set.

The Status Register indicates when interrupt conditions have occurred. The on-chip hardware sets these bits as a result of the occurrence of the corresponding condition. To clear a bit or bits in the Timer Interrupt Flag Register (TFLG1) 14, a write operation must be performed to the register where the status bits to be cleared by the write are set to ones. In this way the programmer is not likely to clear a status bit before it has been recognized.

TABLE 6

| Timer Interrupt Flag Register 1 (TFLG1) 14 | | | | | | | |
|---|---|---|---|---|---|---|---|
| B7 | B6 | B5 | B4 | B3 | B2 | B1 | B0 |
| OC1F | OC2F | OC3F | OC4F | OC5F | IC1F | IC2F | IC3F |

BIT-7 OC1F OUTPUT COMPARE 1 FLAG

This flag bit is set each time the timer counter matches the output compare register 1 value.

A write operation to this bit with the corresponding data bit equal zero will not affect the state of this bit. A write operation to this bit with the corresponding data bit equal one will cause this bit to be cleared.

BIT-6 OC2F OUTPUT COMPARE 2 FLAG

This flag bit is set each time there is a successful compare with the output compare register 2 value.

A write operation to this bit with the corresponding data bit equal zero will not affect the state of this bit. A write operation to this bit with the corresponding data bit equal one will cause this bit to be cleared.

BIT-5 OC3F OUTPUT COMPARE 3 FLAG

This flag bit is set each time the timer counter matches the output compare register 3 value.

A write operation to this bit with the corresponding data bit equal zero will not affect the state of this bit. A write operation to this bit with the corresponding data bit equal one will cause this bit to be cleared.

BIT-4 OC4F OUTPUT COMPARE 4 FLAG

This flag bit is set each time the timer counter matches the output compare register 4 value.

A write operation to this bit with the corresponding data bit equal zero will not affect the state of this bit. A write operation to this bit with the corresponding data bit equal one will cause this bit to be cleared.

BIT-3 OC5F OUTPUT COMPARE 5 FLAG

This flag bit is set each time the timer counter matches the output compare register 5 value.

A write operation to this bit with the corresponding data bit equal zero will not affect the state of this bit. A write operation to this bit with the corresponding data bit equal one will cause this bit to be cleared.

PORTA PORT A 18 DATA REGISTER

TABLE 7

| Port A 18 Data Register | | | | | | | | |
|---|---|---|---|---|---|---|---|---|
| B7 | B6 | B5 | B4 | B3 | B2 | B1 | B0 | |
| PA7 | PA6 | PA5 | PA4 | PA3 | PA2 | PA1 | PA0 | PORTA |
| PIN FUNCTION AND/OR— | | | | | | | | |
| PA7/ PAI/ OC1 | PA6/ OC2/ OC1 | PA5/ OC3/ OC1 | PA4/ OC4/ OC1 | PA3/ OC5/ OC1 | PA2/ IC1 | PA1/ IC2 | PA0/ IC3 | |

READ: any time (inputs return pin level; outputs return pin driver input level)
WRITE: data stored in an internal latch (drives pins only if configured for output)
RESET: causes Port A 18 bits 0,1,2, and 7 to be configured as general purpose inputs, bits 3,4,5, and 6 become general purpose outputs (all zeros).

CFORC TIMER COMPARE FORCE REGISTER 22

TABLE 8

| CFORC Timer Compare Force Register 22 | | | | | | | |
|---|---|---|---|---|---|---|---|
| FOC1 | FOC2 | FOC3 | FOC4 | FOC5 | | | CFORC |

READ: any time but will always return $00 (1 state is transient)
WRITE: any time

FOC1—FOC5 FORCE OUTPUT COMPARE "x" ACTION

A write to this register with the corresponding data bit(s) set causes the action which is programmed for output compare "x" to occur at the next timer count transition. The action taken is the same as if a successful comparison had just taken place with the OCx register except the associated interrupt flag does not get set.

OC1M OUTPUT COMPARE 1 MASK REGISTER 24

TABLE 9

| OC1M Output Compare 1 Mask Register 24 | | | | | | | |
|---|---|---|---|---|---|---|---|
| OC1M7 | OC1M6 | OC1M5 | OC1M4 | OC1M3 | | | OC1M |

READ: any time WRITE: any time
RESET: $00 (OC1 disconnected from Port A logic)
The bits of OC1M 24 correspond bit-for-bit with the bits of Port A 18. For each bit that is to be affected by the successful OC1 compare, the corresponding bit in OC1M 24 should be set to one.

OC1D OUTPUT COMPARE 1 DATA REGISTER 26

TABLE 10

| OC1D Output Compare 1 Data Register 26 | | | | | | | |
|---|---|---|---|---|---|---|---|
| OC1D7 | OC1D6 | OC1D5 | OC1D4 | OC1D3 | | | OC1D |

RESET: indeterminate

The bits of OC1D 26 correspond bit-for-bit with the bits of Port A 18. When a successful OC1 compare occurs, for each bit that is set in OCIM 24, the corresponding data bit in OC1D 26 is stored to the corresponding bit of Port A 18.

TCNT 16-BIT TIMER COUNT REGISTER

TABLE 11

| TCNT 16-Bit Timer Count Register | | | | | | | |
|---|---|---|---|---|---|---|---|
| CNT15 | CNT14 | CNT13 | CNT12 | CNT11 | CNT10 | CNT9 | CNT8 | TCNT (HI) |
| CNT7 | CNT6 | CNT5 | CNT4 | CNT3 | CNT2 | CNT1 | CNT0 | TCNT (LO) |

READ: any time WRITE: has no meaning or effect
RESET: $0000

A full counter 12 read should first address the most significant byte. An MPU read of this address causes the least significant byte to be latched into a buffer for the next CPU cycle so that a double byte read will return the full 16-bit state of the counter 12 at the time of the most significant byte read cycle. This buffer is normally transparent and is accessed when reading the counter least significant byte.

TOC1—TOC5 TIMER OUTPUT COMPARE REGISTERS 10

TABLE 12

| TOC1-TOC5 Timer Output Compare Registers 10 | | | | | | | | |
|---|---|---|---|---|---|---|---|---|
| B7 | B6 | B5 | B4 | B3 | B2 | B1 | B0 | |
| OC115 | OC114 | OC113 | OC112 | OC111 | OC110 | OC19 | OC18 | TOC1 (HI) |
| OC17 | OC16 | OC15 | OC14 | OC13 | OC12 | OC11 | OC10 | TOC1 (LO) |
| OC215 | OC214 | OC213 | OC212 | OC211 | OC210 | OC29 | OC28 | TOC2 (HI) |
| OC27 | OC26 | OC25 | OC24 | OC23 | OC22 | OC21 | OC20 | TOC2 (LO) |
| OC315 | OC314 | OC313 | OC312 | OC311 | OC310 | OC39 | OC38 | TOC3 (HI) |
| OC37 | OC36 | OC35 | OC34 | OC33 | OC32 | OC31 | OC30 | TOC3 (LO) |
| OC415 | OC414 | OC413 | OC412 | OC411 | OC410 | OC49 | OC48 | TOC4 (HI) |
| OC47 | OC46 | OC45 | OC44 | OC43 | OC42 | OC41 | OC40 | TOC4 (LO) |
| OC515 | OC514 | OC513 | OC512 | OC511 | OC510 | OC59 | OC58 | TOC5 (HI) |
| OC57 | OC56 | OC55 | OC54 | OC53 | OC52 | OC51 | OC50 | TOC5 (LO) |
| B7 | B6 | B5 | B4 | B3 | B2 | B1 | B0 | |

READ: any time WRITE: any time
RESET: $FFFF

A write to a High order byte inhibits the compare for the next E-cycle. When the TOCx register matches the TCNT register, the OCxF bit in the TFLG1 register 14 is set and the specified output action takes place.

TIMER CONTROL REGISTER 1 TCTL1 16

TABLE 13

| | Timer Control Register 1 TCTL1 16 | | | | | | | |
|---|---|---|---|---|---|---|---|---|
| | B7 | B6 | B5 | B4 | B3 | B2 | B1 | B0 |
| | OM2 | OL2 | OM3 | OL3 | OM4 | OL4 | OM5 | OL5 | TCTL1
| RESET | 0 | 0 | 0 | 0 | 0 | 0 | 0 | 0 |

READ: any time WRITE: any time

OMX OUTPUT MODE
OLX OUTPUT LEVEL

These four pairs of control bits are encoded to specify the output action to be taken as a result of a successful OCx compare.

| OMx | OLx | Action taken upon successful compare |
|---|---|---|
| 0 | 0 | Timer disconnected from output pin logic |
| 0 | 1 | Toggle OCx output line |
| 1 | 0 | Clear OCx output line to zero |

28 MAIN TIMER INTERRUPT MASK REGISTER 1 TMSK1 28

The bits in TMSK1 28 correspond bit-for-bit with the bits in the TFLG1 14 status register. A zero disables the corresponding flag from causing a hardware interrupt. A one enables the corresponding flag to cause a hardware interrupt.

TABLE 14

| | Main Timer Interrupt Mask Register IMSK1 28 | | | | | | | |
|---|---|---|---|---|---|---|---|---|
| | B7 | B6 | B5 | B4 | B3 | B2 | B1 | B0 |
| | OC1I | OC2I | OC3I | OC4I | OC5I | IC1I | IC2I | IC3I | TMSK1
| RESET | 0 | 0 | 0 | 0 | 0 | 0 | 0 | 0 |

READ: any time WRITE: any time

OC1I—OC5I OUTPUT COMPARE "x" INTERRUPT ENABLE

IC1I—IC3I INPUT CAPTURE "x" INTERRUPT ENABLE

MAIN TIMER INTERRUPT FLAG REGISTER 1 TLFG1 14

The Timer Interrupt Flag Register 14 indicates when interrupt conditions have occurred. On-chip hardware sets these bits as a result of the occurrence of the corresponding condition. To clear a bit or bits in the Timer Interrupt Flag Register 14, a write operation must be performed to the TFLG1 register 14 where the bits to be cleared by the write are set to ones.

TABLE 15

| | Main Timer Interrupt Flag Register 1 TFLG1 14 | | | | | | | |
|---|---|---|---|---|---|---|---|---|
| | B7 | B6 | B5 | B4 | B3 | B2 | B1 | B0 |
| | OC1F | OC2F | OC3F | OC4F | OC5F | IC1F | IC2F | IC3F | TFLG1
| RESET | 0 | 0 | 0 | 0 | 0 | 0 | 0 | 0 |

READ: any time
WRITE: used in clearing mechanism (bits set clear corresponding bits)

OC1F—OC5F OUTPUT COMPARE "x" FLAG

IC1F—IC3F INPUT CAPTURE "x" FLAG

What has been provided, therefore, is an improved output compare system and method for a data processor which minimizes program space and decreases latency to the desired output action. The output compare system and method of the present invention provides a highly accurate timed output signal synchronized with the data processor timer clock and ensures that no pulse narrower than a timer count may be produced.

While there have been described above the principles of the invention in conjunction with specific apparatus, it is to be clearly understood that this description is made only by way of example and not as a limitation to the scope of the invention.

I claim:

1. In a timer system comprising:
   a counter for counting pulses of an input signal, and for providing a count value indicative thereof;
   a compare register for storing therein, in response to a first control signal, a compare value provided thereto via a first bus; and
   a comparator, coupled to the counter and to the compare register, for comparing the count value to the compare value, and for asserting a compare signal when said count and compare values are the same;
   the improvement comprising:
   a force register for storing therein, in response to a second control signal, a control bit provided thereto via a second bus, and for asserting a force signal when said stored control bit is set; and
   logic means, responsive to the compare signal and to the force signal, for producing an output signal in response to the assertion of either said compare signal or said force signal.

2. In a timer method comprising the steps of:
   counting pulses of an input signal, and providing a count value indicative thereof;
   storing a compare value, in response to a first control signal; and
   comparing the count value to the compare value, and asserting a compare signal when said count and compare values are the same;
   the improvement comprising:
   storing a control bit, in response to a second control signal, and asserting a force signal when said stored control bit is set; and
   producing an output signal in response to the assertion of either said compare signal or said force signal.

* * * * *

UNITED STATES PATENT AND TRADEMARK OFFICE
CERTIFICATE OF CORRECTION

PATENT NO. : 4,873,624

DATED : October 10, 1989

INVENTOR(S) : Sibigtroth, et al

It is certified that error appears in the above-identified patent and that said Letters Patent is hereby corrected as shown below:

The title page should read 3 Drawing sheets.

Add the omitted named co-inventor Phillip R. Motz.

Signed and Sealed this

Ninth Day of October, 1990

Attest:

HARRY F. MANBECK, JR.

*Attesting Officer*      Commissioner of Patents and Trademarks